No. 635,490. Patented Oct. 24, 1899.
F. K. LATHROP.
CORN PLANTER.
(Application filed Aug. 26, 1899.)
(No Model.)

Witnesses.
Margaret B. Montgomery
Xander H. Harton

Inventor.
Frank K. Lathrop
by Alfred M. Allen
Attorney.

UNITED STATES PATENT OFFICE.

FRANK K. LATHROP, OF DAYTON, OHIO, ASSIGNOR TO THE OHIO RAKE COMPANY, OF SAME PLACE.

CORN-PLANTER.

SPECIFICATION forming part of Letters Patent No. 635,490, dated October 24, 1899.

Application filed August 26, 1899. Serial No. 728,539. (No model.)

*To all whom it may concern:*

Be it known that I, FRANK K. LATHROP, a citizen of the United States, residing at Dayton, in the county of Montgomery and State of Ohio, have invented certain new and useful Improvements in Corn-Planters, of which the following is a clear and exact description, reference being had to the accompanying drawings, forming part of this specification.

My invention relates to improvements in the conducting-tubes of corn-planters, whereby the seed may be automatically transferred from the hopper to the furrow without any liability of being ground up or broken in passing from hopper to seed-tube and in which the corn-seed is deposited in separate hills with the least liability of scattering or "dribbling" during the advance of the planter.

The improvements consist of a certain novel construction and arrangement of parts to be hereinafter particularly pointed out and claimed.

Figure 1:
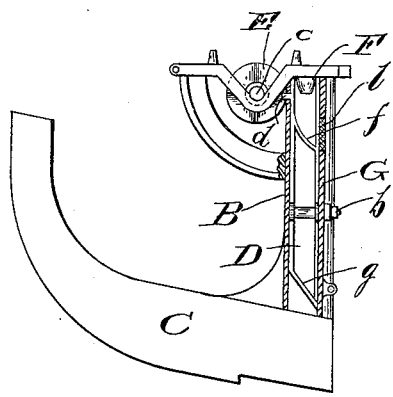
Figure 2:
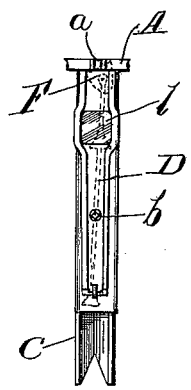
Figure 3:
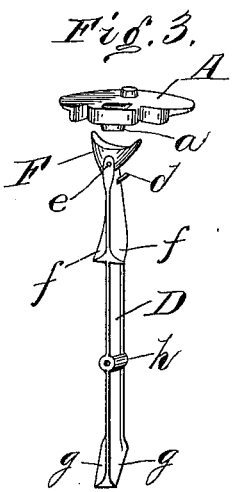
Figure 4:
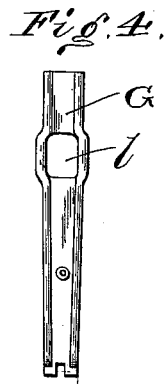

In the drawings, Figure 1 is a side elevation of the runner and seed-conductor of the corn-planter, the conducting-tube being in vertical section. Fig. 2 is a rear elevation of same. Fig. 3 is a perspective view of the seed-valve and disk plate of the planter, the two being slightly separated to show the manner of connection. Fig. 4 is an elevation of the back plate of the conductor.

In the drawings the seed-hopper and ordinary seed-plate, with its operating mechanism, are omitted, as the invention relates only to the means provided for carrying the seed from the hopper to the furrow, and any of the well-known devices for delivering the seed through the opening in the disk plate upon which the seed-valve rests may be employed in connection with the present invention.

A is the disk plate, carrying any well-known seed-plate, by means of which the seed is delivered intermittently in such number of grains as may be desired to the spout $a$ of the disk plate.

B is the conducting-tube extending downward in the rear of the runner C to within a few inches of the ground. Within this conductor is pivoted vertically at $h$ by pivot-bolt $b$ the valve D, dividing the conducting-tube into two compartments, while E is a cam mounted on the shaft $c$, which cam engages the lugs $d$ on the upper end of the valve D. The shaft $c$ is the ordinary connecting-shaft, operated by the usual mechanism for rotating the seed-plate to deliver the seed from the hopper, so that by means of the cam the valve D is vibrated from side to side with each delivery of seed through the disk plate A.

Pivoted to the upper end of the valve D by rivets $e$ or otherwise is the funnel F, arranged to embrace closely the delivery-spout $a$ of the disk plate A and with its lower end delivering first on one side and then on the other side of the valve D as the valve is vibrated from side to side by its operating-cam E, the swivel connection between funnel and valve readily compelling this movement, as the spout $a$ of the disk plate always remains stationary, while the valve D, carrying the funnel, moves from side to side.

The valve D is provided with two pair of sloping seats or shelves $ff$ and $gg$, one pair about midway between disk plate and bottom of valve and the other pair at the lowest point of the valve. As the valve is vibrated or oscillated the conducting-tube is alternately closed in one compartment at the upper end and opened in the other compartment at the lower end, and vice versa, by the two sets of sloping seats $ff$ and $gg$, as will be readily understood, and at the same time the swiveled funnel delivers the grains of corn to the compartment closed at the upper end. The plate G of the conducting-tube, which for convenience in construction is a separate plate, is provided with a glass-covered window $l$ at the height of the upper pair of sloping seats, so that the number of grains to be delivered is always subject to inspection.

The operation of the device will be sufficiently manifest from the foregoing description. The first stroke of the dropping device delivers the grain to one of the upper shelves. The next stroke allows this exact quantity to drop to the lower shelf, while another hill is deposited on the upper shelf of the other compartment, and each succeeding stroke releases the hill to the ground from each compartment.

All liability of imperfect division of the seed or its destruction at the upper end of the valve by the oscillation thereof is obviated by the funnel connection between the disk-spout and conducting-compartment, and the short distance the grain has to fall to its proper point in the ground from the lower shelf prevents any scattering of the seed, insuring perfect planting in hills.

Having thus described my invention, what I claim, and desire to secure by Letters Patent, is—

1. In a corn-planter, a conducting-tube, an oscillating valve therefor, dividing the conductor into two compartments, two pair of seats thereon, to arrest the delivery at the upper and lower ends of each compartment, and means for oscillating the valve to deliver the grain alternately from upper to lower end of each compartment, and thence to the furrow, substantially as shown and described.

2. In a corn-planter, a conducting-tube, an oscillating valve therefor, dividing the conductor into two compartments, two pair of seats thereon, to arrest the delivery at the upper and lower ends of each compartment, and means for oscillating the valve to deliver the grain alternately from upper to lower end of each compartment, and thence to the furrow, with a window in the tube at the upper valve-seats to permit inspection of the grain, substantially as shown and described.

3. In a corn-planter, a conducting-tube, an oscillating valve therefor, dividing the conductor into two compartments, with seats to arrest the delivery of the grain, and a funnel-shaped cup swiveled to the upper end of said valve, making close connection with the seed-hopper spout, and provided with an opening to deliver the grain alternately to each compartment as the valve is oscillated, substantially as shown and described.

4. In a corn-planter, a conducting-tube, an oscillating valve therefor, dividing the conductor into two compartments, two pair of seats thereon, to arrest the delivery at the upper and lower ends of each compartment, and means for oscillating the valve to deliver the grain alternately from upper to lower end of each compartment, and thence to the furrow, with a funnel-shaped cup swiveled to the upper end of said valve making close connection with the seed-hopper spout and provided with an opening to deliver the grain alternately to each compartment as the valve is oscillated, substantially as shown and described.

FRANK K. LATHROP.

In presence of—
OSCAR F. DAVISSON,
KATHARINE P. EVANS.